United States Patent
Li et al.

(10) Patent No.: US 11,347,812 B2
(45) Date of Patent: May 31, 2022

(54) PERCENTILE LINKAGE CLUSTERING

(71) Applicant: Google LLC, Mountain View, CA (US)

(72) Inventors: Feng Li, Sunnyvale, CA (US); Xuerui Wang, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/623,096

(22) PCT Filed: Aug. 30, 2018

(86) PCT No.: PCT/US2018/048813
§ 371 (c)(1),
(2) Date: Dec. 16, 2019

(87) PCT Pub. No.: WO2020/046331
PCT Pub. Date: Mar. 5, 2020

(65) Prior Publication Data
US 2021/0173869 A1    Jun. 10, 2021

(51) Int. Cl.
*G06F 7/00*      (2006.01)
*G06F 16/906*      (2019.01)
(Continued)

(52) U.S. Cl.
CPC .......... *G06F 16/906* (2019.01); *G06F 16/953* (2019.01); *G06K 9/6215* (2013.01); *G06K 9/6221* (2013.01)

(58) Field of Classification Search
CPC .... G06F 16/906; G06F 16/953; G06F 16/358; G06K 9/6215; G06K 9/6221; G06K 9/6226; G06K 9/6219
See application file for complete search history.

(56) References Cited

U.S. PATENT DOCUMENTS 5,317,741 A *   5/1994   Schwanke ................ G06F 8/36
                                                717/120
7,577,652 B1 *   8/2009   Rajan ................. G06Q 30/0257
(Continued)

OTHER PUBLICATIONS

PCT International Preliminary Report on Patentability in International Appln. No. PCT/US2018/048813, dated Mar. 11, 2021, 10 pages.
(Continued)

*Primary Examiner* — Mohammed R Uddin
(74) *Attorney, Agent, or Firm* — Fish & Richardson P.C.

(57) ABSTRACT

Methods, systems, and apparatus, including computer programs encoded on a computer storage medium, for clustering data elements. In one aspect, a method includes determining a respective linkage value for each of multiple cluster pairs, where each cluster pair includes a respective first cluster and a respective second cluster. Determining a linkage value for a cluster pair includes determining a set of pairwise similarity values for the cluster pair. Each pairwise similarity value defines a similarity measure between: (i) a particular data element from the first cluster of the cluster pair, and (ii) a given data element from the second cluster of the cluster pair. The linkage value for the cluster pair is assigned as a given percentile of the set of pairwise similarity values, wherein the given percentile is greater than 0 and less than 100. A cluster pair is merged based on the linkage values of the cluster pairs.

20 Claims, 5 Drawing Sheets

(51) Int. Cl.
*G06F 16/953* (2019.01)
*G06K 9/62* (2022.01)

(56) References Cited

U.S. PATENT DOCUMENTS

| | | | | |
|---|---|---|---|---|
| 8,433,512 | B1* | 4/2013 | Lopatenko | G01C 21/20 |
| | | | | 701/426 |
| 8,463,783 | B1 | 6/2013 | Niyati | |
| 10,162,868 | B1* | 12/2018 | Zappella | G06F 16/2465 |
| 10,496,691 | B1* | 12/2019 | Chen | G06F 16/9038 |
| 10,529,000 | B1* | 1/2020 | Gokkaya | G06Q 30/0625 |
| 10,552,485 | B1* | 2/2020 | Rudish | G06F 16/901 |
| 10,909,177 | B1* | 2/2021 | Rudish | H04L 43/045 |
| 2003/0115191 | A1* | 6/2003 | Copperman | G06F 16/9038 |
| 2004/0210565 | A1* | 10/2004 | Lu | G06Q 10/00 |
| 2008/0133479 | A1* | 6/2008 | Zelevinsky | G06F 16/338 |
| 2009/0204634 | A1* | 8/2009 | Yoshii | G06Q 30/02 |
| 2014/0075004 | A1* | 3/2014 | Van Dusen | G06F 16/90335 |
| | | | | 709/223 |
| 2014/0229281 | A1* | 8/2014 | Zimmerman, Jr | G06Q 30/02 |
| | | | | 705/14.54 |
| 2014/0258002 | A1* | 9/2014 | Zimmerman | G06Q 30/0256 |
| | | | | 705/14.72 |
| 2015/0169725 | A1* | 6/2015 | Jing | G06F 16/24578 |
| | | | | 707/737 |
| 2016/0048556 | A1* | 2/2016 | Kelly | G06Q 30/02 |
| | | | | 707/767 |
| 2016/0171090 | A1* | 6/2016 | Schwartz | G06Q 10/101 |
| | | | | 707/730 |
| 2017/0024186 | A1* | 1/2017 | Fazl Ersi | G06K 9/6222 |
| 2018/0075115 | A1* | 3/2018 | Murray | G06F 16/2456 |
| 2018/0285685 | A1* | 10/2018 | Singh | G06F 16/9024 |
| 2019/0303459 | A1* | 10/2019 | Yan | G06F 16/953 |

OTHER PUBLICATIONS

International Search Report and Written Opinion in International Application No. PCT/US2018/048813, dated Nov. 12, 2018, 15 pages.

EP Office Action in European Appln. No. 18769272, dated Jun. 14, 2021, 9 pages.

* cited by examiner

PERCENTILE LINKAGE CLUSTERING

This application is a National Stage Application under 35 U.S.C. § 371 and claims the benefit of International Application No. PCT/US2018/048813, filed Aug. 30, 2018, the disclosure of which is incorporated herein by reference.

BACKGROUND

This specification relates to processing data using a clustering model.

A clustering model can process a set of data elements to generate a clustering which defines an assignment of each of the data elements to a respective group of one or more data elements.

SUMMARY

This specification describes a system implemented as computer programs on one or more computers in one or more locations that determines a clustering of a set of data elements.

According to a first aspect there is provided a method which includes, at each of one or more iterations, obtaining data defining a current clustering a plurality of data elements. The current clustering defines an assignment of each of the data elements to a respective cluster, and each cluster represents a respective group of one or more data elements. A respective linkage value is determined for each of multiple cluster pairs, where each cluster pair includes a respective first cluster defined by the current clustering and a respective second cluster defined by the current clustering. Determining a linkage value for a cluster pair includes determining a set of pairwise similarity values for the cluster pair, where each pairwise similarity value defines a similarity measure between: (i) a particular data element from the first cluster of the cluster pair, and (ii) a given data element from the second cluster of the cluster pair. The linkage value for the cluster pair is assigned to be a given percentile of the set of pairwise similarity values, where the given percentile is greater than 0 and less than 100. A particular cluster pair is identified to be merged based on the linkage values for the cluster pairs. The data defining the current clustering is updated by merging the identified cluster pair.

In some implementations, at a first iteration of the one or more iterations, the clustering defines an assignment of each of the data elements to a different respective cluster.

In some implementations, identifying a particular cluster pair to be merged based on the linkage values for the plurality of cluster pairs includes identifying a particular cluster pair with a highest linkage value.

In some implementations, the method includes determining the highest linkage value is greater than a predetermined threshold linkage value.

In some implementations, the method includes outputting the data defining the current clustering after a final iteration of the one or more iterations.

In some implementations, determining a set of pairwise similarity values for the cluster pair, wherein each pairwise similarity value defines a similarity measure between: (i) a particular data element from the first cluster of the cluster pair, and (ii) a given data element from the second cluster of the cluster pair, includes accessing a data store comprising pre-computed pairwise similarity values defining respective similarity measures between each pair of data elements of the plurality of data elements.

In some implementations, the data elements are keywords.

In some implementations, the similarity measure between: (i) a particular data element from the first cluster of the cluster pair, and (ii) a given data element from the second cluster of the cluster pair, characterizes a similarity between: (i) a particular set of search results obtained in response to providing the particular data element as a query to a search engine, and (ii) a given set of search results obtained in response to providing the given data element as a query to the search engine.

In some implementations, the method includes, after a final iteration of the one or more iterations, receiving a digital component request including a specific keyword. A particular digital component is determined to be eligible for transmission in response to the digital component request by determining the particular digital component has distribution parameters which specify a keyword cluster which includes the specific keyword. The keyword cluster is a cluster defined by the current clustering at the final iteration of the one or more iterations. The particular digital component is transmitted in response to the digital component request.

According to a second aspect there is provided a system including a data processing apparatus, and a memory in data communication with the data processing apparatus. The memory stores instructions that cause the data processing apparatus to perform the operations of the previously described method.

According to a third aspect there is provided one or more non-transitory computer storage media storing instructions that when executed by one or more computers cause the one or more computers to perform the operations of the previously described method.

Particular embodiments of the subject matter described in this specification can be implemented so as to realize one or more of the following advantages.

This specification describes a clustering system which is configured to, for each cluster pair at each clustering iteration, assign a linkage value to the cluster pair based on a given percentile of a set of pairwise similarity values computed for the cluster pair. Since the given percentile is selected to be strictly between 0 and 100 (that is, greater than 0 but less than 100), the linkage values assigned to cluster pairs by the clustering system are insensitive to "outlier" pairwise similarity values. A pairwise similarity value may be referred to as an outlier if the pairwise similarity value is unusually high or unusually low compared to other pairwise similarity values in a set of pairwise similarity values computed for a cluster pair. The clustering system determines whether to merge cluster pairs based on the assigned linkage values and can therefore determine a stable clustering of a set of data elements into large and cohesive clusters even when some of the pairwise similarity values computed for cluster pairs are outliers.

In contrast, some conventional clustering systems assign linkage values to cluster pairs that are highly sensitive to outlier pairwise similarity values. These conventional systems may generate unstable clusters, that is, clusters that are strongly affected by outlier pairwise similarity values. Moreover, these conventional systems may generate clusters with undesirable characteristics, e.g., large numbers of small clusters or "thin" clusters which are not cohesive.

The clustering system can generate large and cohesive clusters of items. In some situations, the clustering system can create clusters of users, images, text articles, web pages, or any other appropriate data items. In a specific example, the clustering system can be used to create clusters of semantically related keywords for use as distribution parameters in a digital component distribution system. By enabling digital component providers to set distribution parameters for digital components by selecting keyword clusters, the distribution system can reduce the burden on digital component providers to manually specify large numbers of related keywords in setting distribution parameters. For example, rather than manually specifying the related keywords "shoes", "shoe", "footwear", "boots", "cleats", "heels", "slippers", and "sneakers", a digital component provider can select an appropriate predetermined keyword cluster which includes some or all of these keywords. As such, the process of selecting distribution parameters can be simplified.

Moreover, by enabling digital component providers to set distribution parameters for digital components by selecting keyword clusters of semantically related keywords, the distribution system can reduce variations in transmission requirements for digital components with similar distribution parameters. For example, the distribution system may determine substantially different transmission requirements for digital components with distribution parameters specifying semantically related keywords depending on the "popularity" of those keywords. The popularity of a keyword refers to how frequently the keyword is specified by digital component providers as a distribution parameter. For example, although the keywords "shoes" and "shoe" are semantically related, the keyword "shoes" may be more popular than the keyword "shoe" (i.e., since "shoes" is a more natural keyword formulation than "shoe"). In this example, the distribution system may determine a larger number of digital components to be eligible for transmission in response to a digital component request specifying the keyword "shoes" than the keyword "shoe". Therefore, the distribution system may determine a higher transmission requirement for the digital component with distribution parameters specifying the keyword "shoes" than for the digital component with distribution parameters specifying the keyword "shoe". By enabling digital component providers to set distribution parameters specifying keyword clusters of semantically related keywords rather than individual keywords, the distribution system described in this specification is more likely to determine stable and consistent transmission requirements for digital components with similar distribution parameters.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a clustering system which is configured to process a set of data elements to determine a clustering of the data elements, i.e., an assignment of each of the data elements to a respective group of one or more data elements. Starting from an initial clustering, the clustering system iteratively merges cluster pairs based on linkage values assigned to the cluster pairs. A linkage value defines a similarity of a first cluster and a second cluster. The clustering system assigns the linkage value between a first cluster and a second cluster based on a given percentile of a set of pairwise similarity values between pairs of data elements which include a respective first data element from the first cluster and a respective second data element from the second cluster.

In some cases, the data elements are keywords, and the clustering system determines a clustering of the keywords into keyword clusters of semantically related keywords. The keyword clusters can be provided to a digital component distribution system which is configured to transmit digital components for presentation with electronic documents. Digital component providers can select one or more keyword clusters determined by the clustering system as digital component distribution parameters to be used by the digital component distribution system for determining the eligibility of digital components for transmission in response to digital component requests.

As used throughout this document, the phrase "digital component" refers to a discrete unit of digital content or digital information (e.g., a video clip, audio clip, multimedia clip, image, text, or another unit of content). A digital component can be electronically stored in a physical memory device as a single file or in a collection of files, and digital components can take the form of video files, audio files, multimedia files, image files, or text files and include advertising information, such that an advertisement is a type of digital component. Generally, a digital component is defined by (or provided by) a single provider or source (e.g., an advertiser, publisher, or other content provider), but a digital component provided from one source could be enhanced with data from another source (e.g., weather information, real time event information, or other information obtained from another source).

These features and other features are described in more detail below. The description that follows provides examples of clustering techniques in the context of clustering keywords. However, the clustering techniques discussed in this document are generally applicable to any data items. As such, the use of keywords in the examples provided throughout this document is not to be construed as limiting the application of these clustering techniques.

Figure 1:
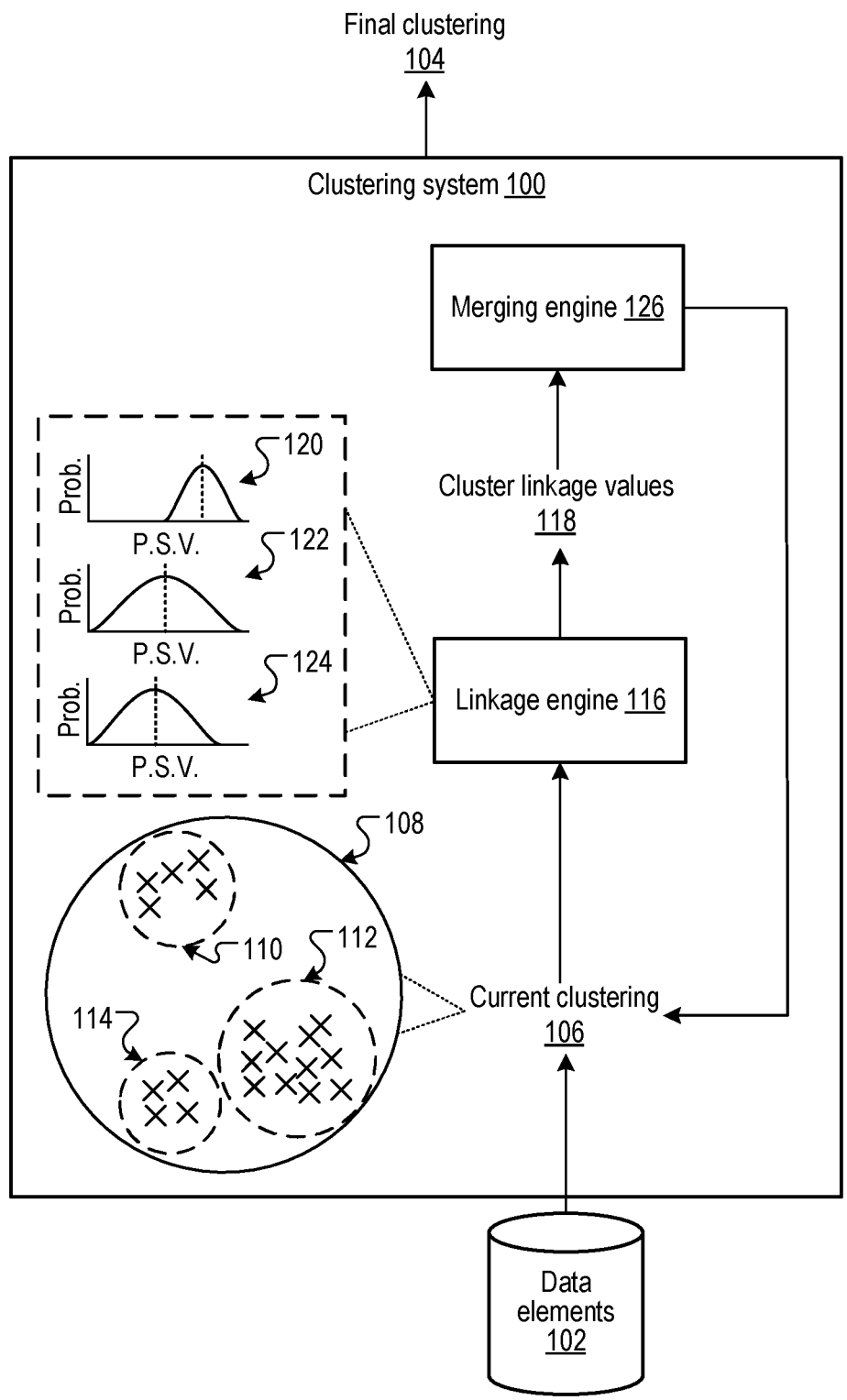
FIG. 1 is a block diagram of an example clustering system.

FIG. 1 shows an example clustering system 100. The clustering system 100 is an example of a system implemented as computer programs on one or more computers in one or more locations in which the systems, components, and techniques described below are implemented.

The clustering system 100 is configured to process a set of data elements 102 to determine a final clustering 104 of the data elements 102. The final clustering 104 of the data elements 102 defines an assignment of each of the data elements 102 to a respective group of one or more data elements (which is referred to in this specification as a "cluster"). For example, if the data elements 102 are represented as {A, B, C, D, E} (where A is a first data element, B is a second data element, etc.), the final clustering 104 of the data elements 102 may define an assignment of data elements {A, D, E} to a first cluster and data elements {B, C} to a second cluster. As will be described in more detail below, the system 100 generates a final clustering 104 which tends to cause data elements which are "similar" (e.g., according to a numerical similarity measure) to be assigned to the same cluster, and data elements which are "dissimilar" to be assigned to different clusters.

The data elements 102 may represent keywords, web pages, user profiles on a social network, products, news articles, pictures, videos, or any other form of data. Generally, the similarity of different data elements 102 can be computed using an appropriate numerical similarity measure. For example, if the data elements 102 are keywords, then a numerical similarity measure between a first keyword and a second keyword may be computed based on a similarity of search results obtained by providing the respective keywords as queries to a search engine (as will be described in more detail with reference to FIG. 2).

To determine the final clustering 104 of the data elements 102, the system 100 iteratively (i.e., at each of multiple clustering iterations) updates a current clustering 106 of the data elements 102. For the first clustering iteration, the current clustering 106 of the data elements 102 may be provided as an input to the system 100 or may be determined by the system 100 in accordance with a predefined rule. For example, for the first clustering iteration, the system 100 may determine the current clustering 106 of the data elements 102 to define an assignment of each of the data elements 102 to a different respective cluster. In this example, the number of clusters defined by the current clustering 106 at the first clustering iteration is equal to the number of data elements 102.

An example current clustering 106 is illustrated by 108. In the example current clustering 108, the data elements 102 are represented by "X" symbols and the current clustering defines an assignment of the data elements 102 into three clusters (i.e., the clusters 110, 112, and 114).

At each clustering iteration, the system 100 updates the current clustering 106 by merging two different clusters defined by the current clustering 106. Merging two clusters refers to combining the two clusters into a single cluster (e.g., so each data element previously belonging to either one of the two clusters is thereafter considered to belong to the same merged cluster). In this manner, the system 100 progressively groups the data elements 102 into larger clusters (i.e., clusters which include more data elements) over multiple clustering iterations, until the system 100 determines that a clustering termination criterion is met. For example, as will be described in more detail below, the system 100 may determine the clustering termination criterion to be met if no two clusters are determined to be "similar enough" to be merged.

At a given clustering iteration, to update the current clustering 106, the system 100 processes the current clustering 106 using a linkage engine 116 to determine a set of cluster linkage values 118. Each cluster linkage value 118 corresponds to a respective cluster pair, i.e., a respective first cluster defined by the current clustering 106 and a respective second cluster defined by the current clustering 106. A cluster linkage value 118 corresponding to a cluster pair can be understood to define a similarity between the first cluster of the cluster pair and the second cluster of the cluster pair. For the example current clustering 108, the linkage engine 116 may determine respective cluster linkage values 118 for the cluster pairs {110, 112}, {110, 114}, and {112, 114}.

To determine a linkage value 118 for a given cluster pair, the linkage engine 116 determines a set of pairwise similarity values for the cluster pair. Each pairwise similarity value defines a similarity measure between: (i) a respective first data element from the first cluster of the cluster pair, and (ii) a respective second data element from the second cluster of the cluster pair. For example, if the first cluster of the cluster pair is defined by data elements {A, B} and the second cluster of the cluster pair is defined by data elements {C, D}, then the linkage engine 116 may determine respective pairwise similarity values between data elements: A and C, A and D, B and C, and B and D. After determining the set of pairwise similarity values for the cluster pair, the linkage engine 116 assigns a given percentile of the set of pairwise similarity values for the cluster pair as the linkage value 118 for the cluster pair (as will be described in more detail with reference to FIG. 2). Generally, the given percentile is strictly between 0 and 100, that is, the given percentile is greater than 0 and less than 100 (but the system need not be constrained to only these values). The particular value of the given percentile is system hyper-parameter which can be selected to optimize the performance of a downstream system which uses the final clustering 104 output by the system 100. An example of a downstream system which uses the final clustering 104 output by the system 100 is the digital component distribution system 310 described further with reference to FIG. 3 and FIG. 4.

By assigning a linkage value 118 for each cluster pair as a given percentile (which is strictly between 0 and 100) of the set of pairwise similarity values for the cluster pair, the linkage engine 116 determines linkage values 118 which are insensitive to "outlier" pairwise similarity values. A pairwise similarity value may be referred to as an outlier if the pairwise similarity value is unusually high or unusually low compared to other pairwise similarity values in a set of pairwise similarity values for a cluster pair. Certain pairwise similarity values may be outliers if, for example, the system 100 uses a "noisy" (e.g., high variance) similarity measure between data elements 102. In a particular example, the data elements 102 may be keywords and the system 100 may determine the pairwise similarity values using a similarity measure between keywords based on respective sets of search results obtained by providing the keywords as queries to a search engine. In this example, certain pairwise similarity values may be outliers due to random variations in the sets of search results returned by the search engine for different keywords.

As an illustrative example, for the example current clustering 108, the linkage engine 116 may determine a set of pairwise similarity values for the cluster pair {112, 114} which follow the distribution 120, a set of pairwise similarity values for the cluster pair {110, 112} which follow the distribution 122, and a set of pairwise similarity values for the cluster pair {110,114} which follow the distribution 124. Each of the distributions 120, 122, and 124 depicted in FIG. 1 are plotted with reference to an x-axis which represents pairwise similarity values (i.e., "P.S.V."). Each of the distributions 120, 122, and 124 depicted in FIG. 1 are plotted with reference to a y-axis which represents probabilities (i.e., "Prob.") of pairwise similarity values. For a given cluster pair, the probability of a pairwise similarity value can be understood to represent the frequency of occurrence of the pairwise similarity value in the set of pairwise similarity values for the cluster pair. In this example, the linkage engine 116 may be configured to assign the linkage value for each cluster pair to be the 50$^{th}$ percentile of the corresponding set of pairwise similarity values, which is illustrated by the dotted vertical lines in 120, 122, and 124. Although for illustrative purposes the distributions 120, 122, and 124 are depicted as continuous probability distributions, in practice the distribution of pairwise similarity values for a cluster pair is a discrete probability distribution.

After the linkage engine 116 generates the linkage values 118, a merging engine 126 processes the linkage values 118 to identify a particular cluster pair to be merged. For example, the merging engine 126 may identify the cluster pair defined by the current clustering 106 with the highest linkage value 118 (i.e., the cluster pair which can be understood to be the "most similar") as the cluster pair to be merged. If the merging engine 126 determines the highest linkage value 118 to be less than a predetermined threshold linkage value (e.g., indicating that no two clusters are "similar enough" to be merged), the system 100 may determine that the clustering termination criterion is met and output the final clustering 104. Otherwise, the merging engine 126 updates the current clustering 106 by merging the cluster pair with the highest linkage value 118 and proceeds to the next clustering iteration.

As an illustrative example, for the example current clustering 108, the merging engine 126 may identify the cluster pair {112, 114} to be merged. More specifically, the merging engine 126 may determine the linkage value for the cluster pair {112, 114} (e.g., the dotted line representing the 50$^{th}$ percentile of the pairwise similarity value distribution 120) to be the highest linkage value, and therefore identify the cluster pair {112, 114} to be merged.

When the data elements 102 are keywords and the similarity between keywords is determined based on the similarity of search results obtained by providing the keywords as queries to a search engine, the final clustering 104 may define a grouping of the keywords into semantically similar keyword clusters. For example, the final clustering 104 may define an assignment of the keywords "shoes", "shoe", "footwear", "boots", "cleats", "heels", "slippers", "sneakers", and the like, to the same cluster. As another example, the final clustering 104 may define an assignment of the keywords "pineapple", "banana", "orange", "apple", "kiwi", "lime", "lemon", "kumquat", and the like, to the same cluster. As will be described further with reference to FIG. 3 and FIG. 4, the semantically similar keyword clusters defined by the final clustering 104 can be used as distribution criteria determining the eligibility of digital components for transmission in response to digital component requests.

Figure 2:
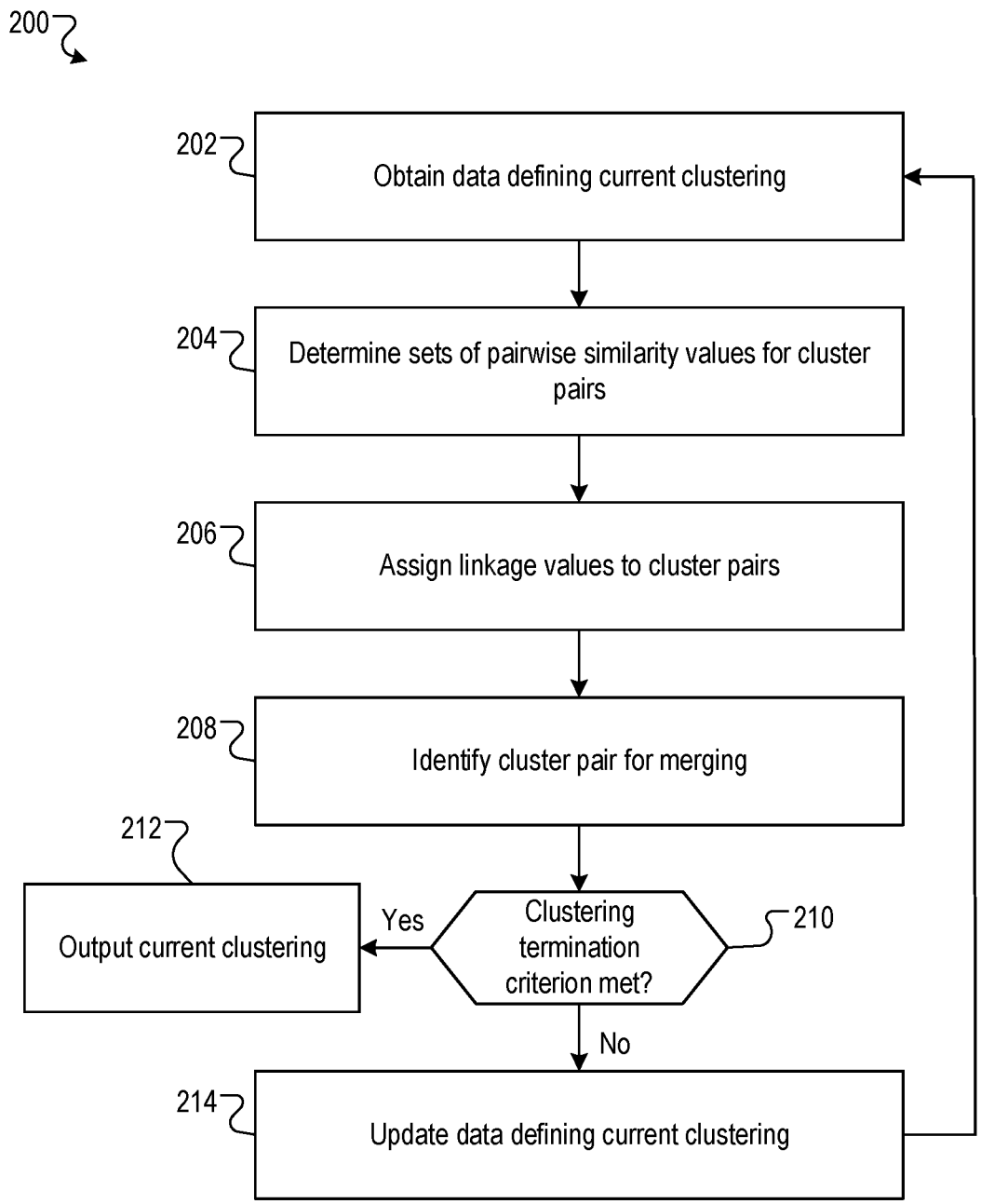
FIG. 2 is a flow diagram of an example process for clustering data elements.

FIG. 2 is a flow diagram of an example process 200 for clustering data elements. In particular, the process 200 describes a particular clustering iteration of an iterative clustering process which can execute over multiple clustering iterations. For convenience, the process 200 will be described as being performed by a system of one or more computers located in one or more locations. For example, a clustering system, e.g., the clustering system 100 of FIG. 1, appropriately programmed in accordance with this specification, can perform the process 200.

The system obtains data defining the current clustering at the current clustering iteration (202). For example, the system may access a data store (e.g., a logical data storage area or a physical data storage device) to retrieve data defining the current clustering. As described earlier, the data defining the current clustering defines an assignment of each of the data elements to a respective cluster. The data defining the current clustering can be stored in any appropriate format. For example, the data defining the current clustering can be stored in a tabular format which associates each data element with a numerical value indexing a corresponding cluster.

The system determines a respective set of pairwise similarity values for each cluster pair (204). For a given cluster pair, each pairwise similarity value defines a similarity measure between: (i) a respective first data element from the first cluster of the cluster pair, and (ii) a respective second data element from the second cluster of the cluster pair. For example, if the first cluster of the cluster pair includes N data elements and the second cluster of the cluster pair includes M data elements, the system may determine a set of N×M pairwise similarity values for the cluster pair.

The system can use any appropriate similarity measure between the data elements to determine the pairwise similarity values. For example, if the data elements are keywords, then the similarity measure between a first keyword and a second keyword may be computed based on a similarity of search results obtained by providing the respective keywords as queries to a search engine. In a particular example, the similarity measure may be determined based on an intersection between: (i) a first set of search results obtained in response to providing the first keyword as a query to the search engine, and (ii) a second set of search results obtained in response to providing the second keyword as a query to the search engine. That is, the similarity measure may be determined based on how many search results are common to both the first set of search results and the second set of search results. As another example, if the data elements can be represented as respective vectors of numerical values, then the similar measure between a first data element and a second data element may be determined based on a Euclidean distance or cosine similarity between the vector representing the first data element and the vector representing the second data element.

To determine the set of pairwise similarity values for a cluster pair, the system can access a data store (e.g., a logical data storage area or a physical data storage device) which includes pre-computed pairwise similarity values defining respective similarity measures between each pair of data elements. The pre-computed pairwise similarity values may be provided to the system or may be computed by the system prior to the first clustering iteration. The pre-computed pairwise similarity values can be stored in any appropriate format. For example, the pre-computed pairwise similarity values can be stored in a tabular format which associates each pair of data elements with a corresponding similarity measure. By determining the respective set of pairwise similarity values for each cluster pair by accessing pre-computed pairwise similarity values, the system can avoid re-computing pairwise similarity values between data elements at each clustering iteration.

The system assigns a respective linkage value to each cluster pair (206). For a given cluster pair, the system assigns a linkage value to the cluster pair which is equal to (or within some tolerance range of) a given percentile of the set of pairwise similarity values determined for the cluster pair (as described with reference to 204). Generally, the given percentile is strictly between 0 and 100, that is, is greater than 0 and less than 100. For example, the given percentile may be the 20$^{th}$ percentile, the 80$^{th}$ percentile, or any other percentile strictly between 0 and 100.

For a given set of pairwise similarity values, the system can determine an n-th percentile of the set of pairwise similarity values to be any particular value where n % of the pairwise similarity values in the set of pairwise similarity values are less than the particular value. For example, if the set of pairwise similarity values is given by {0.44, 0.78, 0.79, 0.81, 0.85}, then the system can determine the $20^{th}$ percentile to be any value greater than 0.44 and less than or equal to 0.78 (that is, any number in the range (0.44,0.78]).

As described earlier, by assigning a linkage value to each cluster pair as a given percentile of the set of pairwise similarity values for the cluster pair, the system determines linkage values which are insensitive to outlier pairwise similarity values. In a particular example, the set of pairwise similarity values for a cluster pair may be given by {0.44, 0.78, 0.79, 0.81, 0.85}, and the system may be configured to assign a linkage value to each cluster pair which is equal to (or within some tolerance range of) the $20^{th}$ percentile of the set of pairwise similarity values. In this example, the system may assign the linkage value 0.78 to the cluster pair (i.e., since 20% of the pairwise similarity values are less than 0.78), despite the set of pairwise similarity values containing the outlier pairwise similarity value 0.44.

The system identifies a particular cluster pair to be merged based on the linkage values assigned to the cluster pairs (208). For example, the system may identify the cluster pair which is assigned a highest linkage value as the cluster pair to be merged. As described earlier, merging two clusters refers to combining the two clusters into a single cluster (e.g., so each data element previously belonging to either one of the two clusters is thereafter considered to belong the same merged cluster).

The system determines whether a clustering termination criterion is met (210). For example, the system may determine the clustering termination criterion to be met if the highest linkage value assigned to a cluster pair is less than a predetermined threshold linkage value. As another example, the system may determine the clustering termination criterion to be met if the system has performed a predetermined number of clustering iterations.

In response to determining that the clustering termination criterion is not met, the system updates the data defining the current clustering (214). More specifically, the system updates the data defining the current clustering by merging the cluster pair identified as the particular cluster pair to be merged (e.g., as described in 208). To update the data defining the current clustering, the system may access a data store (e.g., a logical data storage area or physical data storage device) which is configured to store the data defining the current clustering, and update the data stored in the data store which defines the current clustering. For example, the data defining the current clustering may be stored in a tabular format which associates each data element with a numerical value indexing a corresponding cluster. In this example, the system may update the current clustering by associating each data element belonging to either one of the two clusters to be merged with the same numerical value indexing a corresponding merged cluster.

After updating the data defining the current clustering, the system can return to 202 and repeat the preceding steps.

In response to determining that the clustering termination criterion is not met, the system can output data defining the current clustering. For example, the system can store the data defining the current clustering in a data store. As another example, the system can provide the data defining the current clustering for use in another system. For example, the system can provide the data defining the current clustering to the digital component distribution system described with reference to FIG. 3.

Figure 3:
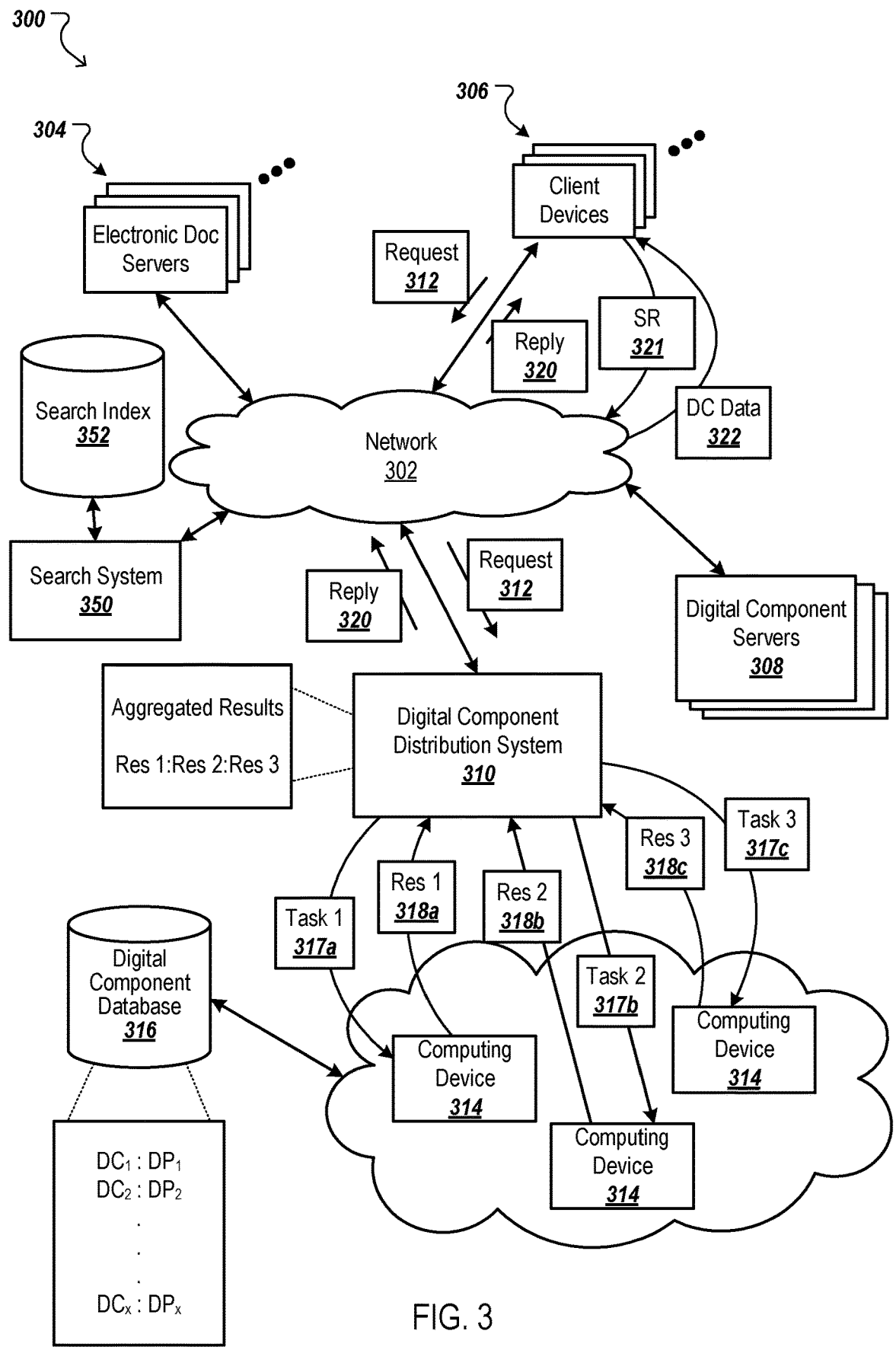
FIG. 3 is a block diagram of an example environment in which digital components are distributed.

FIG. 3 is a block diagram of an example environment 300 in which digital components are transmitted for presentation with electronic documents. As will be described in more detail below, keyword clusters output by the clustering system 100 (as described with reference to FIG. 1) can be used as distribution parameters for determining the eligibility of digital components for transmission in response to digital component requests.

The example environment 300 includes a network 302, such as a local area network (LAN), a wide area network (WAN), the Internet, or a combination thereof. The network 302 connects electronic document servers 304, client devices 306, digital component servers 308, and a digital component distribution system 310 (also referred to as a "distribution system" 310). The example environment 300 may include many different electronic document servers 304, client devices 306, and digital component servers 308.

A client device 306 is an electronic device that is capable of requesting and receiving resources over the network 302. Example client devices 306 include personal computers, mobile communication devices (e.g., mobile phones), and other devices that can send and receive data over the network 302. A client device 306 typically includes a user application, such as a web browser, to facilitate the sending and receiving of data over the network 302, but native applications executed by the client device 306 can also facilitate the sending and receiving of data over the network 302.

An electronic document is data that presents a set of content at a client device 306. Examples of electronic documents include webpages, word processing documents, portable document format (PDF) documents, images, videos, search results pages, and feed sources. Native applications (e.g., "apps"), such as applications installed on mobile, tablet, or desktop computing devices are also examples of electronic documents. Electronic documents can be provided to client devices 306 by electronic document servers 304 ("Electronic Doc Servers"). For example, the electronic document servers 304 can include servers that host publisher websites. In this example, the client device 306 can initiate a request for a given publisher webpage, and the electronic server 304 that hosts the given publisher webpage can respond to the request by sending machine executable instructions that initiate presentation of the given webpage at the client device 306.

In another example, the electronic document servers 304 can include app servers from which client devices 306 can download apps. In this example, the client device 306 can download files required to install an app at the client device 306, and then execute the downloaded app locally.

Electronic documents can include a variety of content. For example, an electronic document can include static content (e.g., text or other specified content) that is within the electronic document itself and/or does not change over time. Electronic documents can also include dynamic content that may change over time or on a per-request basis. For example, a publisher of a given electronic document can maintain a data source that is used to populate portions of the electronic document. In this example, the given electronic document can include one or more tags or scripts that cause the client device 306 to request content from the data source when the given electronic document is processed (e.g., rendered or executed) by a client device 306. The client device 306 integrates the content obtained from the data source into the given electronic document to create a composite electronic document including the content obtained from the data source.

In some situations, a given electronic document can include one or more digital component tags or digital component scripts that reference the digital component distribution system 310. In these situations, the digital component tags or digital component scripts are executed by the client device 306 when the given electronic document is processed by the client device 306. Execution of the digital component tags or digital component scripts configures the client device 306 to generate a request for one or more digital components 312 (referred to as a "component request"), which is transmitted over the network 302 to the digital component distribution system 310. For example, a digital component tag or digital component script can enable the client device 306 to generate a packetized data request including a header and payload data. The component request 312 can include event data specifying features such as a name (or network location) of a server from which the digital component is being requested, a name (or network location) of the requesting device (e.g., the client device 306), and/or information that the digital component distribution system 310 can use to select one or more digital components provided in response to the request. The component request 312 is transmitted, by the client device 306, over the network 302 (e.g., a telecommunications network) to a server of the digital component distribution system 310.

The component request 312 can include event data specifying other event features, such as the electronic document being requested and characteristics of locations of the electronic document at which digital component can be presented. For example, event data specifying a reference (e.g., URL) to an electronic document (e.g., webpage) in which the digital component will be presented, available locations of the electronic documents that are available to present digital components, sizes of the available locations, and/or media types that are eligible for presentation in the locations can be provided to the digital component distribution system 310. Similarly, event data specifying keywords associated with the electronic document ("document keywords") or entities (e.g., people, places, or things) that are referenced by the electronic document can also be included in the component request 312 (e.g., as payload data) and provided to the digital component distribution system 310 to facilitate identification of digital components that are eligible for presentation with the electronic document. The event data can also include a search query that was submitted from the client device 306 to obtain a search results page, and/or data specifying search results and/or textual, audible, or other visual content that is included in the search results.

Component requests 312 can also include event data related to other information, such as information that a user of the client device has provided, geographic information indicating a state or region from which the component request was submitted, or other information that provides context for the environment in which the digital component will be displayed (e.g., a time of day of the component request, a day of the week of the component request, a type of device at which the digital component will be displayed, such as a mobile device or tablet device). Component requests 312 can be transmitted, for example, over a packetized network, and the component requests 312 themselves can be formatted as packetized data having a header and payload data. The header can specify a destination of the packet and the payload data can include any of the information discussed above.

The component distribution system 310 chooses digital components that will be presented with the given electronic document in response to receiving the component request 312 and/or using information included in the component request 312. In some implementations, a digital component is selected (using the techniques described herein) in less than a second to avoid errors that could be caused by delayed selection of the digital component. For example, delays in providing digital components in response to a component request 312 can result in page load errors at the client device 306 or cause portions of the electronic document to remain unpopulated even after other portions of the electronic document are presented at the client device 306. Also, as the delay in providing the digital component to the client device 306 increases, it is more likely that the electronic document will no longer be presented at the client device 306 when the digital component is delivered to the client device 306, thereby negatively impacting a user's experience with the electronic document. Further, delays in providing the digital component can result in a failed delivery of the digital component, for example, if the electronic document is no longer presented at the client device 306 when the digital component is provided.

In some implementations, the digital component distribution system 310 is implemented in a distributed computing system that includes, for example, a server and a set of multiple computing devices 314 that are interconnected and identify and distribute digital components in response to requests 312. The set of multiple computing devices 314 operate together to identify a set of digital components that are eligible to be presented in the electronic document from a corpus of millions of available digital components (DC1-x). The millions of available digital components can be indexed, for example, in a digital component database 316. Each digital component index entry can reference the corresponding digital component and/or include distribution parameters (DP1-DPx) that contribute to (e.g., condition or limit) the distribution/transmission of the corresponding digital component. For example, the distribution parameters can contribute to the transmission of a digital component by requiring that a component request include at least one criterion that matches (e.g., either exactly or with some pre-specified level of similarity) one of the distribution parameters of the digital component.

In some implementations, the distribution parameters for a particular digital component can include distribution keywords that must be matched (e.g., by electronic documents, document keywords, or terms specified in the component request 312) in order for the digital component to be eligible for presentation. In other words, the distribution parameters are used to trigger distribution (e.g., transmission) of the digital components over the network 302. The distribution parameters can also require that the component request 312 include information specifying a particular geographic region (e.g., country or state) and/or information specifying that the component request 312 originated at a particular type of client device (e.g., mobile device or tablet device) in order for the digital component to be eligible for presentation.

The distribution parameters can also specify an eligibility value (e.g., ranking score, bid, or some other specified value) that is used for evaluating the eligibility of the digital component for distribution/transmission (e.g., among other available digital components), for example, by the component evaluation process. In some situations, the eligibility value can specify a maximum amount of compensation that a provider of the digital component is willing to submit in response to the transmission of the digital component (e.g., for each instance of specific events attributed to the presentation of the digital component, such as user interaction with the digital component).

The identification of the eligible digital component can be segmented into multiple tasks 317a-317c that are then assigned among computing devices within the set of multiple computing devices 314. For example, different computing devices in the set 314 can each analyze a different portion of the digital component database 316 to identify various digital components having distribution parameters that match information included in the component request 312. In some implementations, each given computing device in the set 314 can analyze a different data dimension (or set of dimensions) and pass (e.g., transmit) results (Res 1-Res 3) 318a-318c of the analysis back to the digital component distribution system 310. For example, the results 318a-318c provided by each of the computing devices in the set 314 may identify a subset of digital components that are eligible for distribution in response to the component request and/or a subset of the digital components that have certain distribution parameters. The identification of the subset of digital components can include, for example, comparing the event data to the distribution parameters, and identifying the subset of digital components having distribution parameters that match at least some features of the event data.

The digital component distribution system 310 aggregates the results 318a-318c received from the set of multiple computing devices 314 and uses information associated with the aggregated results to: (i) select one or more digital components that will be provided in response to the request 312, and (ii) determine transmission requirements for the one or more digital components. For example, the digital component distribution system 310 can select a set of winning digital components (one or more digital components) based on the outcome of one or more component evaluation processes. In turn, the digital component distribution system 310 can generate and transmit, over the network 302, reply data 320 (e.g., digital data representing a reply) that enables the client device 306 to integrate the set of winning digital components into the given electronic document, such that the set of winning digital components and the content of the electronic document are presented together at a display of the client device 306.

In some implementations, the client device 306 executes instructions included in the reply data 320, which configures and enables the client device 306 to obtain the set of winning digital components from one or more digital component servers. For example, the instructions in the reply data 320 can include a network location (e.g., a Uniform Resource Locator (URL)) and a script that causes the client device 306 to transmit a server request (SR) 321 to the digital component server 308 to obtain a given winning digital component from the digital component server 308. In response to the request, the digital component server 308 will identify the given winning digital component specified in the server request 321 (e.g., within a database storing multiple digital components) and transmit, to the client device 306, digital component data (DC Data) 322 that presents the given winning digital component in the electronic document at the client device 306.

To facilitate searching of electronic documents, the environment 300 can include a search system 350 that identifies the electronic documents by crawling and indexing the electronic documents (e.g., indexed based on the crawled content of the electronic documents). Data about the electronic documents can be indexed based on the electronic document with which the data are associated. The indexed and, optionally, cached copies of the electronic documents are stored in a search index 352 (e.g., hardware memory device(s)). Data that are associated with an electronic document is data that represents content included in the electronic document and/or metadata for the electronic document.

Client devices 306 can submit search queries to the search system 350 over the network 302. In response, the search system 350 accesses the search index 352 to identify electronic documents that are relevant to the search query. The search system 350 identifies the electronic documents in the form of search results and returns the search results to the client device 306 in a search results page. A search result is data generated by the search system 350 that identifies an electronic document that is responsive (e.g., relevant) to a particular search query, and includes an active link (e.g., hypertext link) that causes a client device to request data from a specified network location (e.g., URL) in response to user interaction with the search result. An example search result can include a web page title, a snippet of text or a portion of an image extracted from the web page, and the URL of the web page. Another example search result can include a title of a downloadable application, a snippet of text describing the downloadable application, an image depicting a user interface of the downloadable application, and/or a URL to a location from which the application can be downloaded to the client device 306. In some situations, the search system 350 can be part of, or interact with, an application store (or an online portal) from which applications can be downloaded for install at a client device 306 in order to present information about downloadable applications that are relevant to a submitted search query. Like other electronic documents, search results pages can include one or more slots in which digital components (e.g., advertisements, video clips, audio clips, images, or other digital components) can be presented.

To select a digital component to be transmitted in response to a component request, the distribution system 310 may identify a set of digital components that are eligible to be transmitted in response to the component request. The distribution system 310 may then select one or more of the eligible digital components to be transmitted through, e.g., an auction procedure. In some implementations, the distribution system 310 performs an auction procedure by ranking the eligible digital components in accordance with their respective eligibility values, and selecting one or more highest-ranked digital components to be transmitted in response to the component request.

For example, the distribution system 310 may identify digital components A, B, and C as eligible to be transmitted in response to a component request. In this example, digital component A has an eligibility value of $5, digital component B has an eligibility value of $1, and digital component C has an eligibility value of $5.5, where the eligibility values of the digital components represent bids associated with the digital components. The distribution system 310 may rank (e.g., in descending order) the digital components in accordance with their respective eligibility values as: C, A, B. Finally, the distribution system 310 may select the highest ranked digital component C for transmission in response to the component request.

After selecting a digital component to be transmitted in response to a digital component request, the distribution system 310 determines a transmission requirement for the selected digital component. A transmission requirement specifies an action to be performed by the provider of a digital component in response to a transmission of the digital component. For example, the transmission requirement may specify that the provider of the digital component submit an amount of compensation in response to the transmission of the digital component. In some cases, the amount of compensation specifies an amount to be submitted for each instance of specific events attributed to the presentation of the digital component (e.g., user interactions with the digital component).

The distribution system 310 may determine the transmission requirement of the selected digital component based on the eligibility value of the selected digital component and/or the eligibility values of the other digital components that were determined as eligible to be transmitted in response to the component request. For example, the distribution system 310 may identify digital components A, B, and C as eligible for transmission in response to a digital component request, where A, B, and C have respective eligibility values of $5, $1, and $5.5. The distribution system 310 may select digital component C for transmission (since it has the highest eligibility value), and may determine the transmission requirement for digital component C to be the next highest eligibility value from amongst the eligibility values of the eligible digital components. In this example, next highest eligibility value is $5 (i.e., the eligibility value of digital component A), and therefore the distribution system 310 may determine the transmission requirement of digital component C to be $5.

As described above, the distribution system 310 may identify a set of digital components that are eligible to be transmitted for presentation in an electronic document in response to a digital component request based on distribution parameters corresponding to each digital component. In some cases, the distribution parameters corresponding to a digital component may include a keyword cluster (i.e., a set of multiple keywords). The distribution system 310 may determine that one or more keywords from the keyword cluster must be matched (e.g., by electronic documents, document keywords, or terms specified in a digital component request) in order for the digital component to be eligible for transmission.

For example, the distribution system 310 may receive a digital component request which includes a specific keyword. In this example, the distribution system 310 may determine that a particular digital component with distribution parameters specifying a keyword cluster is eligible for transmission in response to the digital component request only if the specific keyword is included in the keyword cluster.

In some implementations, the distribution system 310 enables providers of digital components to set distribution parameters specifying keyword clusters from a predetermined set of keyword clusters. The distribution system 310 may obtain a predetermined set of keyword clusters as an output of the clustering system 100 (e.g., the final clustering 104). The keyword clusters output by the clustering system 100 may define a grouping of keywords into semantically related keyword clusters. For example, the clustering system 100 may output a keyword cluster defining an assignment of the keywords "shoes", "shoe", "footwear", "boots", "cleats", "heels", "slippers", "sneakers", and the like, to the same cluster.

By enabling digital component providers to set distribution parameters for digital components by selecting keyword clusters, the distribution system 310 can reduce the burden on digital component providers to manually specify large numbers of related keywords in setting distribution parameters. For example, rather than manually specifying the related keywords "shoes", "shoe", "footwear", "boots", "cleats", "heels", "slippers", and "sneakers", a digital component provider can select an appropriate predetermined keyword cluster which includes some or all of these keywords.

Moreover, by enabling digital component providers to set distribution parameters for digital components by selecting keyword clusters of semantically related keywords, the distribution system 310 can reduce variations in transmission requirements for digital components with similar distribution parameters. For example, the distribution system 310 may determine substantially different transmission requirements for digital components with distribution parameters specifying semantically related keywords depending on the "popularity" of those keywords. The popularity of a keyword refers to how frequently the keyword is specified by digital component providers as a distribution parameter. For example, although the keywords "shoes" and "shoe" are semantically related, the keyword "shoes" may be more popular than the keyword "shoe" (i.e., since "shoes" is a more natural keyword formulation than "shoe"). In this example, the distribution system 310 may determine a larger number of digital components to be eligible for transmission in response to a digital component request specifying the keyword "shoes" than the keyword "shoe". Therefore, the distribution system 310 may determine a higher transmission requirement for the digital component with distribution parameters specifying the keyword "shoes" than for the digital component with distribution parameters specifying the keyword "shoe". By enabling digital component providers to set distribution parameters specifying keyword clusters of semantically related keywords rather than individual keywords, the distribution system 310 is more likely to determine similar transmission requirements for digital components with similar distribution parameters.

Figure 4:
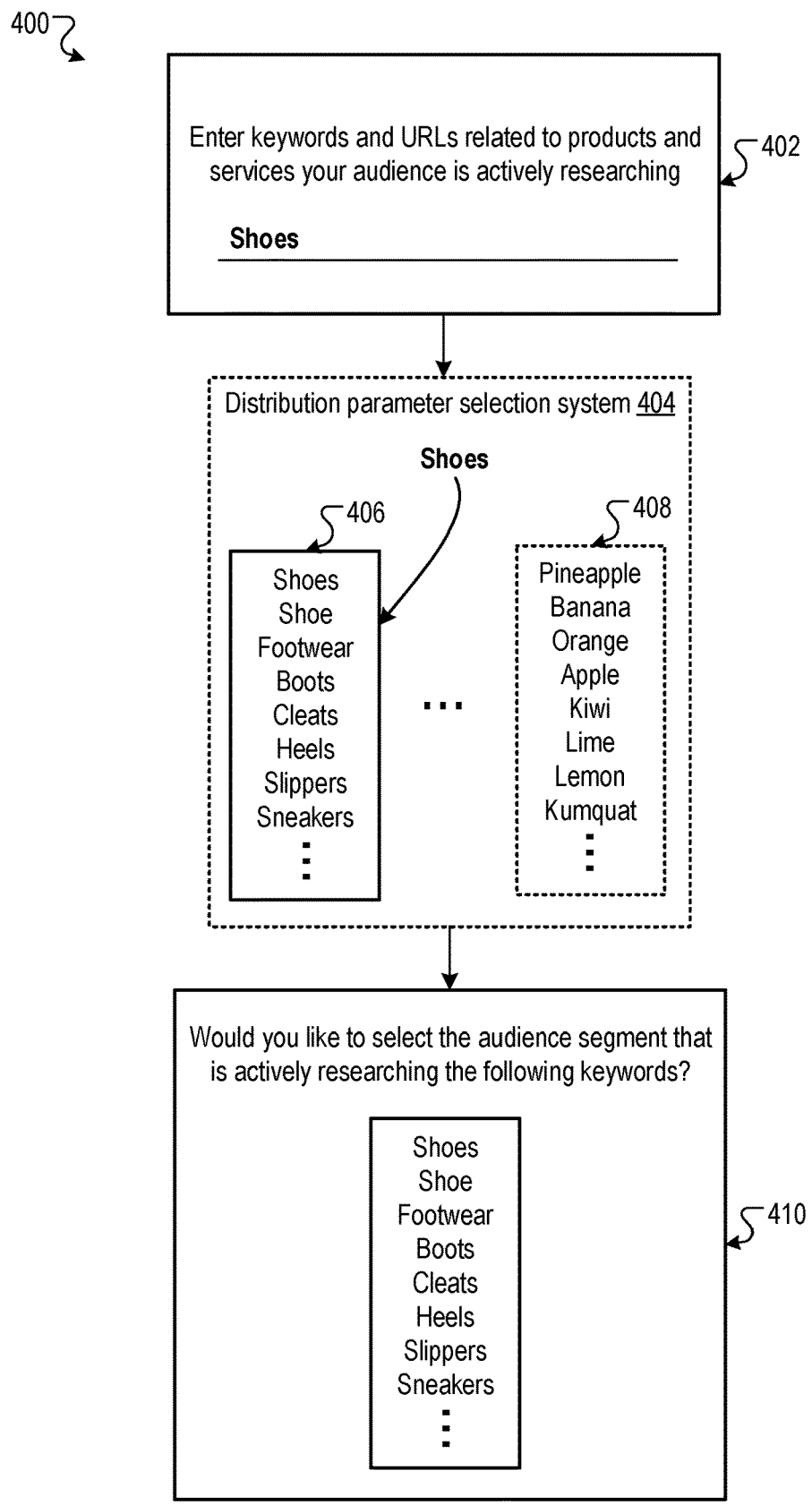
FIG. 4 is an illustration of an example data flow for selecting distribution parameters including keyword clusters.

FIG. 4 is an illustration of an example data flow 400 for selecting keyword clusters as distribution parameters.

An interactive window 402 is presented (e.g., on display screen) to a digital component provider. The interactive window 402 prompts the digital component provider to "Enter keywords and URLs related to products and services your audience is actively researching". The digital component provider can enter a response to the prompt in the interactive window 402 using any appropriate data input device (e.g., a keyboard).

The data input by the digital component provider in response to the prompt in the interactive window 402 is provided to a distribution parameter selection system 404 (e.g., which may be a component of the distribution system 310 described with reference to FIG. 3). If the distribution parameter selection system 404 detects that the data input by the digital component provider in response to the prompt in the interactive window 402 is a URL, the distribution parameter selection system 404 can process the URL to determine one or more related keywords. For example, the distribution parameter selection system 404 can retrieve one or keywords from a landing page corresponding to the URL.

The distribution parameter selection system 404 identifies a keyword cluster for each keyword obtained from the response to the prompt in the interactive window 402. For example, for each keyword obtained from the response to the prompt in the interactive window 402, the distribution parameter selection system 404 can identify a corresponding keyword cluster which includes the keyword from a database of predetermined keyword clusters. In a particular example, the keyword obtained from the response to the prompt in the interactive window 402 may be "shoes", and the distribution parameter selection system 404 may identify a corresponding keyword cluster 406 including the keywords: "shoes", "shoe", "footwear", "boots", "cleats", "heels", "slippers", and "sneakers", amongst others. As described earlier, the database of predetermined keyword clusters may be a set of keyword clusters of semantically related keywords which are output by the clustering system 100 described with reference to FIG. 1. The database of predetermined keyword clusters can include other keyword clusters, e.g., the keyword cluster 408 which includes the keywords "pineapple", "banana", "orange", "apple", "kiwi", "lime", "lemon", and "kumquat", amongst others.

The distribution parameter selection system 404 presents the identified keyword clusters in another interactive window 410, and prompts the digital component provider to select (e.g., using a mouse-click) whether to set the identified keyword clusters as distribution parameters for a digital component. In response to receiving an input from the digital component provider indicating the identified keyword clusters should be set a distribution parameters for the digital component, the distribution parameter selection system 404 stores data associating the identified keyword clusters as distribution parameters associated with the digital component.

Figure 5:
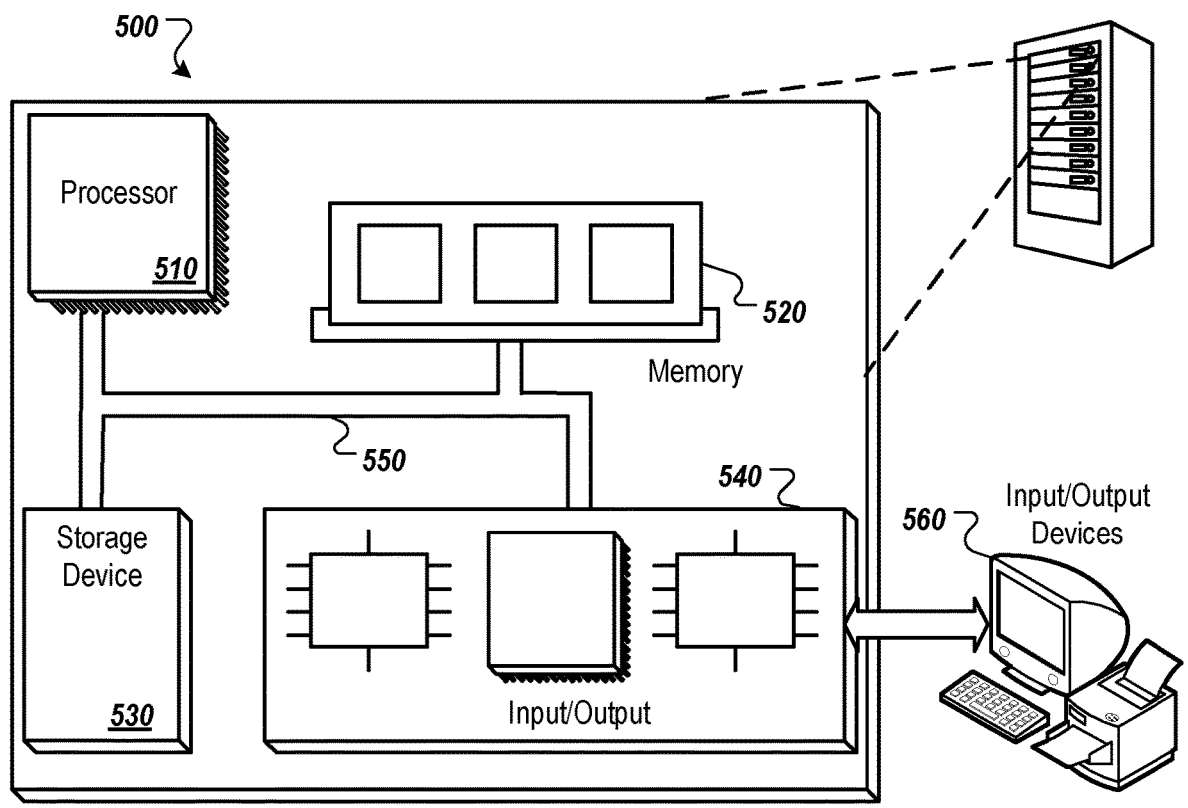
FIG. 5 is a block diagram of an example computing system.

FIG. 5 is a block diagram of an example computer system 500 that can be used to perform operations described above. The system 500 includes a processor 510, a memory 520, a storage device 530, and an input/output device 540. Each of the components 510, 520, 530, and 540 can be interconnected, for example, using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 can include, for example, a hard disk device, an optical disk device, a storage device that is shared over a network by multiple computing devices (e.g., a cloud storage device), or some other large capacity storage device.

The input/output device 540 provides input/output operations for the system 500. In one implementation, the input/output device 540 can include one or more network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 560. Other implementations, however, can also be used, such as mobile computing devices, mobile communication devices, set-top box television client devices, etc.

Although an example processing system has been described in FIG. 5, implementations of the subject matter and the functional operations described in this specification can be implemented in other types of digital electronic circuitry, or in computer software, firmware, or hardware, including the structures disclosed in this specification and their structural equivalents, or in combinations of one or more of them.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method implemented by a data processing apparatus, the method comprising:
   clustering a plurality of data elements of a same type, comprising, at each of a plurality of clustering iterations:
      obtaining data defining a current clustering of the plurality of data elements, wherein the current clustering defines an assignment of each of the data elements to a respective cluster, and wherein each cluster represents a respective group of one or more data elements;
      determining a respective linkage value for each of a plurality of cluster pairs, wherein each cluster pair comprises a respective first cluster defined by the current clustering and a respective second cluster defined by the current clustering, wherein determining a linkage value for a cluster pair comprises:
         determining a set of pairwise similarity values for the cluster pair, wherein each pairwise similarity value defines a similarity measure between: (i) a particular data element from the first cluster of the cluster pair, and (ii) a given data element from the second cluster of the cluster pair;
         processing the set of pairwise similarity values for the cluster pair to determine an N-th percentile of the set of pairwise similarity values for the cluster pair,
            wherein the N-th percentile of the set of pairwise similarity values for the cluster pair defines a score that exceeds N % of the pairwise similarity values in the set of pairwise similarity values for the cluster pair, and
            wherein N is greater than 0 and less than 100; and
         determining the linkage value for the cluster pair based on the N-th percentile of the set of pairwise similarity values for the cluster pair;
      identifying a particular cluster pair to be merged based on the linkage values for the plurality of cluster pairs; and
      updating the data defining the current clustering by merging the identified cluster pair; and
   taking an action based on the current clustering of the plurality of data elements after a final clustering iteration.

2. The method of claim 1, wherein at a first clustering iteration of the plurality of clustering iterations, the current clustering defines an assignment of each of the data elements to a different respective different cluster.

3. The method of claim 1, wherein identifying a particular cluster pair to be merged based on the linkage values for the plurality of cluster pairs comprises:
   identifying a particular cluster pair with a highest linkage value as the particular cluster pair to be merged.

4. The method of claim 3, further comprising:
   determining the highest linkage value is greater than a predetermined threshold linkage value.

5. The method of claim 1, wherein taking an action based on the current clustering of the plurality of data elements after the final clustering iteration comprises:
   outputting data defining the current clustering of the plurality of data elements after the final clustering iteration.

6. The method of claim 1, wherein determining a set of pairwise similarity values for the cluster pair, wherein each pairwise similarity value defines a similarity measure between: (i) a particular data element from the first cluster of the cluster pair, and (ii) a given data element from the second cluster of the cluster pair, comprises:
   accessing a data store comprising pre-computed pairwise similarity values defining respective similarity measures between each pair of data elements of the plurality of data elements.

7. The method of claim 1, wherein the data elements are keywords.

8. The method of claim 1, wherein the similarity measure between: (i) a particular data element from the first cluster of the cluster pair, and (ii) a given data element from the second cluster of the cluster pair, characterizes a similarity between: (i) a particular set of search results obtained in response to providing the particular data element as a query to a search engine, and (ii) a given set of search results obtained in response to providing the given data element as a query to the search engine.

9. The method of claim 7, wherein taking an action based on the current clustering of the plurality of data elements after a final clustering iteration comprises:
   receiving a request for a digital component, wherein the request includes a specific keyword;
   determining that a particular digital component is eligible for transmission in response to the request, including:
      determining the particular digital component has distribution parameters which specify a keyword cluster which includes the specific keyword, wherein the keyword cluster is a cluster defined by the current clustering after the final clustering iteration; and
   transmitting the particular digital component in response to the request.

10. A system, comprising:
    a data processing apparatus;
    a memory in data communication with the data processing apparatus and storing instructions that cause the data processing apparatus to perform operations comprising:
    clustering a plurality of data elements of a same type, comprising, at each of a plurality of clustering iterations:
       obtaining data defining a current clustering of the plurality of data elements, wherein the current clustering defines an assignment of each of the data elements to a respective cluster, and wherein each cluster represents a respective group of one or more data elements;
       determining a respective linkage value for each of a plurality of cluster pairs, wherein each cluster pair comprises a respective first cluster defined by the current clustering and a respective second cluster defined by the current clustering, wherein determining a linkage value for a cluster pair comprises:
          determining a set of pairwise similarity values for the cluster pair, wherein each pairwise similarity value defines a similarity measure between: (i) a particular data element from the first cluster of the cluster pair, and (ii) a given data element from the second cluster of the cluster pair;

processing the set of pairwise similarity values for the cluster pair to determine an N-th percentile of the set of pairwise similarity values for the cluster pair, wherein the N-th percentile of the set of pairwise similarity values for the cluster pair defines a score that exceeds N % of the pairwise similarity values in the set of pairwise similarity values for the cluster pair, and wherein N is greater than 0 and less than 100; and determining the linkage value for the cluster pair based on the N-th percentile of the set of pairwise similarity values for the cluster pair;

identifying a particular cluster pair to be merged based on the linkage values for the plurality of cluster pairs; and updating the data defining the current clustering by merging the identified cluster pair; and taking an action based on the current clustering of the plurality of data elements after a final clustering iteration.

11. The system of claim 10, wherein at a first clustering iteration of the plurality of clustering iterations, the current clustering defines an assignment of each of the data elements to a different respective different cluster.

12. The system of claim 10, wherein identifying a particular cluster pair to be merged based on the linkage values for the plurality of cluster pairs comprises:

identifying a particular cluster pair with a highest linkage value as the particular cluster pair to be merged.

13. The system of claim 12, wherein the operations further comprise:

determining the highest linkage value is greater than a predetermined threshold linkage value.

14. The system of claim 10, wherein taking an action based on the current clustering of the plurality of data elements after the final clustering iteration comprises:

outputting data defining the current clustering of the plurality of data elements after the final clustering iteration.

15. One or more non-transitory computer storage media storing instructions that when executed by one or more computers cause the one or more computers to perform operations comprising:

clustering a plurality of data elements of a same type, comprising, at each of a plurality of clustering iterations:

obtaining data defining a current clustering of the plurality of data elements, wherein the current clustering defines an assignment of each of the data elements to a respective cluster, and wherein each cluster represents a respective group of one or more data elements;

determining a respective linkage value for each of a plurality of cluster pairs, wherein each cluster pair comprises a respective first cluster defined by the current clustering and a respective second cluster defined by the current clustering, wherein determining a linkage value for a cluster pair comprises:

determining a set of pairwise similarity values for the cluster pair, wherein each pairwise similarity value defines a similarity measure between: (i) a particular data element from the first cluster of the cluster pair, and (ii) a given data element from the second cluster of the cluster pair;

processing the set of pairwise similarity values for the cluster pair to determine an N-th percentile of the set of pairwise similarity values for the cluster pair, wherein the N-th percentile of the set of pairwise similarity values for the cluster pair defines a score that exceeds N % of the pairwise similarity values in the set of pairwise similarity values for the cluster pair, and wherein N is greater than 0 and less than 100; and determining the linkage value for the cluster pair based on the N-th percentile of the set of pairwise similarity values for the cluster pair;

identifying a particular cluster pair to be merged based on the linkage values for the plurality of cluster pairs; and updating the data defining the current clustering by merging the identified cluster pair; and taking an action based on the current clustering of the plurality of data elements after a final clustering iteration.

16. The non-transitory media of claim 15, wherein at a first clustering iteration of the plurality of clustering iterations, the current clustering defines an assignment of each of the data elements to a different respective different cluster.

17. The non-transitory media of claim 15, wherein identifying a particular cluster pair to be merged based on the linkage values for the plurality of cluster pairs comprises:

identifying a particular cluster pair with a highest linkage value as the particular cluster pair to be merged.

18. The non-transitory media of claim 17, wherein the operations further comprise:

determining the highest linkage value is greater than a predetermined threshold linkage value.

19. The non-transitory media of claim 15, wherein taking an action based on the current clustering of the plurality of data elements after the final clustering iteration comprises:

outputting data defining the current clustering of the plurality of data elements after the final clustering iteration.

20. The non-transitory media of claim 15, wherein determining a set of pairwise similarity values for the cluster pair, wherein each pairwise similarity value defines a similarity measure between: (i) a particular data element from the first cluster of the cluster pair, and (ii) a given data element from the second cluster of the cluster pair, comprises:

accessing a data store comprising pre-computed pairwise similarity values defining respective similarity measures between each pair of data elements of the plurality of data elements.

* * * * *